United States Patent
Lee et al.

(10) Patent No.: US 9,208,375 B2
(45) Date of Patent: Dec. 8, 2015

(54) FACE RECOGNITION MECHANISM

(71) Applicants: Hyungsoo Lee, Seoul (KR); Hongmo Je, Seoul (KR); Bongnam Kang, Seoul (KR)

(72) Inventors: Hyungsoo Lee, Seoul (KR); Hongmo Je, Seoul (KR); Bongnam Kang, Seoul (KR)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 14/129,602

(22) PCT Filed: Sep. 27, 2012

(86) PCT No.: PCT/KR2012/007844
§ 371 (c)(1),
(2) Date: Jan. 28, 2014

(87) PCT Pub. No.: WO2013/048160
PCT Pub. Date: Apr. 4, 2013

(65) Prior Publication Data
US 2014/0147023 A1 May 29, 2014

(30) Foreign Application Priority Data
Sep. 27, 2011 (KR) .................. 10-2011-0097795

(51) Int. Cl.
*G06K 9/00* (2006.01)
*G06K 9/46* (2006.01)

(52) U.S. Cl.
CPC ........ *G06K 9/00288* (2013.01); *G06K 9/00281* (2013.01); *G06K 9/46* (2013.01); *G06K 9/4671* (2013.01)

(58) Field of Classification Search
CPC ......... G06K 9/00281; G06K 9/00288; G06K 9/00248; G06K 9/4609; G06K 9/46; G06K 9/62; G06K 9/00222; G06K 9/00287; G06K 9/00228; H04N 5/33; G06T 7/0083; G06F 17/3028
See application file for complete search history.

(56) References Cited

U.S. PATENT DOCUMENTS 5,450,504 A * 9/1995 Calia .............................. 382/118
8,831,295 B2 * 9/2014 Coons ........................... 382/118

(Continued)

FOREIGN PATENT DOCUMENTS

| JP | 2003-296735 | 10/2003 |
|----|-------------|---------|
| JP | 2006-202049 | 8/2006  |

(Continued)

OTHER PUBLICATIONS

Non Final Reasons for Rejection, JP2014-531737, Mar. 3, 2015, 3 pages.

*Primary Examiner* — Amir Alavi
(74) *Attorney, Agent, or Firm* — Blakely, Sokoloff, Taylor & Zafman LLP

(57) ABSTRACT

The present disclosure relates to a face recognition method, an apparatus, and a computer-readable recording medium for executing the method. According to some aspects of the present disclosure, the face recognition method includes: (a) a key point setting step of setting key points at designated positions on an input face image; (b) a key point descriptor extracting step of extracting each descriptor for each key point; and (c) a matching step of determining whether the input face image matches pre-stored face images using descriptors for key points within a designated region including each descriptor for each first key point obtained from the input face image, and second key points of pre-stored face images which correspond to first key points obtained from the input face image.

22 Claims, 4 Drawing Sheets

(a)

(b) (c)

(d) (e)

(f)

(56) References Cited

U.S. PATENT DOCUMENTS

| | | | |
|---|---|---|---|
| 2007/0127787 A1* | 6/2007 | Castleman et al. | 382/118 |
| 2010/0111363 A1* | 5/2010 | Kelly et al. | 382/103 |
| 2013/0251215 A1* | 9/2013 | Coons | 382/118 |
| 2013/0328760 A1* | 12/2013 | Honea | 345/156 |
| 2014/0147023 A1* | 5/2014 | Lee et al. | 382/118 |
| 2014/0226877 A1* | 8/2014 | Je et al. | 382/118 |
| 2014/0253701 A1* | 9/2014 | Wexler et al. | 348/62 |

FOREIGN PATENT DOCUMENTS

| | | |
|---|---|---|
| JP | 2009-133856 | 6/2009 |
| JP | 2009-284084 | 12/2009 |
| JP | 2011-008507 | 1/2011 |
| WO | WO2009/133856 | 4/2009 |

\* cited by examiner

FACE RECOGNITION MECHANISM

The present patent application is a U.S. National Phase Application under 35 U.S.C. 371 of International Application No. PCT/KR2012/007844 filed Sep. 27, 2012, which claims priority from Korean Application No. 10-2011-0097795, filed Sep. 27, 2011, the contents of which are incorporated herein in their entirety by reference.

TECHNICAL FIELD

The present disclosure relates to a method and apparatus for recognizing a face and a computer-readable recording medium for executing the method. More specifically, the present disclosure relates to, in order to apply a technique such as scale invariant feature transformation (SIFT) or the like to a face recognition and to improve performance, face recognition being performed based on key points extracted from predetermined positions of an input image, thereby allowing high-precision recognition that reflects changes in facial images.

BACKGROUND

Biometrics is a technology for recognizing physical features, such as a fingerprint, a face, an iris, a vein and the like, which are different from person to person. Such physical features cannot be stolen or copied by others, like a key or password, and may be utilized in the security field or the like since they are not at risk of being changed or lost. Face recognition is a type of biometric technology that includes a technique for detecting a face region in a video or a picture image and identifying a face included in the detected face region. Such face recognition technology can be utilized in not only the security field but also a variety of other applications, in line with the progress in the era of smart phones.

Specifically, face recognition is a technique for identifying a face in a detected facial image by using positions of feature points. The feature points may include a center point of an eye, both end points of each eye, both end points and a center point of an eyebrow, both end points of a lip or the like.

Although statistical methods, such as principal component analysis (PCA), local descriptor analysis (LDA) and the like, have traditionally been used in face recognition techniques, since feature information extracted from a local region of a face is more reliable for detecting a change in a facial image due to, for example, a change in pose or illumination, LDA is more commonly used in recent days.

Another technique, scale invariant feature transformation (SIFT) shows excellent recognition performance in object recognition, but does not show good performance in face recognition, and has limitations in its application. There are various reasons why this method shows poor performance in face recognition. First, since a facial image (unlike an image of an object) is not angulated but deformable and even a face of the same person looks quite different depending on viewing directions, a position of a feature point also changes accordingly. However, the SIFT method cannot take such a change into account to recognize a face. Second, a distance-based matching technique or a region-based matching technique generally used in a descriptor-based matching shows poor performance in the case of a facial image taken under a strong illumination or an image of a person in an unusual pose. Accordingly, the above-described problems should be solved in order to apply the SIFT (which is normally used for object recognition) to face recognition.

Even when face recognition is performed by a technique other than the SIFT (such as, a SURF, LESH, or GLOH), it is difficult to improve the performance of face recognition.

DETAILED DESCRIPTION

Technical Problem

Therefore, an object of the present disclosure is to solve the above-described problems.

In addition, another object of the present disclosure is to improve the performance of face recognition by recognizing a face with reference to descriptors of key points extracted from respectively predetermined positions of previously stored facial images and an input facial image, in a manner that addresses the problems of conventional methods.

Still another object of the present disclosure is to show good face recognition performance even when an input facial image is changed, by allocating identification symbols to all key points of an input facial image and allocating the most frequently allocated identification symbol as an identification symbol of the input facial image.

Technical Solution

The representative configurations of the present disclosure for achieving the above objects are as follows.

According to an aspect of the present disclosure, there is provided a face recognition method, including: (a) setting key points at predetermined positions of an input facial image; (b) extracting a descriptor of each of the key points; and (c) determining whether the input facial image matches previously stored facial images based on descriptors of first key points obtained from the input facial image and descriptors of key points in a predetermined region including second key points of each of the previously stored facial images corresponding to the first key points obtained from the input facial image.

According to another aspect of the present disclosure, there is provided a face recognition apparatus, including: a key point position setting unit for setting key points at predetermined positions of an input facial image; a key point descriptor extraction unit for extracting a descriptor of each of the key points; and a matching unit for determining whether the input facial image matches previously stored facial images based on descriptors of first key points obtained from the input facial image and descriptors of key points in a predetermined region including second key points of each of the previously stored facial images corresponding to the first key points obtained from the input facial image.

According to some aspects of the present disclosure, the face recognition apparatus further includes a face detection unit for detecting a face from a facial image; and a normalization unit for generating the facial image by normalizing the detected face image to a predetermined size.

According to some aspects of the present disclosure, identification symbols are allocated to the respective first key points by comparing distances between the descriptors of the respective first key points and the respective second key points, and the most frequently allocated identification symbol is allocated as an identification symbol of the facial image.

According to some aspects of the present disclosure, grid blocks are formed on the facial image, and the grid blocks are formed as the predetermined regions or a block surrounding the second key points corresponding to the first key points obtained from the facial image is set as the predetermined region.

In addition, there is further provided a computer-readable recording medium for recording a computer program for executing the above-described methods for implementing the various aspects of the present disclosure.

Technical Effects

According to some aspects of the present disclosure, since a face is recognized by setting key points to respective fixed positions of previously stored facial images and an input facial image and by extracting a descriptor from each of the key points, the face can be recognized with high accuracy and can reflect a change in the facial image.

According to some aspects of the present disclosure, since distances between descriptors of respective key points of an input facial image and descriptors of key points in regions adjacent to respective corresponding key points of previously stored facial images are compared with one another, an identification symbol of the closest key point is allocated, and votes are made for identification symbols allocated to the key points of the input facial image so as to allocate an identification symbol of the input facial image, good performance for recognition may be obtained even when some regions of the facial image are mismatched due to a change in pose or illumination.

EXPLANATION OF REFERENCE NUMERALS

Figure 1:
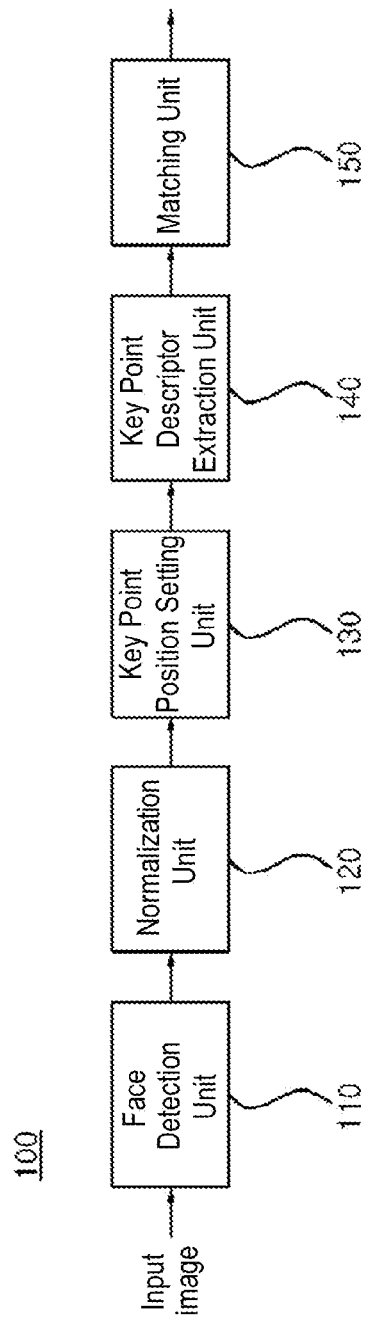
FIG. 1 is a block diagram illustrating the configuration of a face recognition apparatus using a SIFT technique in accordance with an embodiment of the present disclosure.

100: Face Recognition Apparatus
110: Face Detection Unit
120: Normalization Unit
130: Key Point Position Setting Unit
140: Key Point Descriptor Extraction Unit
150: Matching Unit Embodiments In the following detailed description, references are made to the accompanying drawings that show, by way of illustration, specific embodiments in which the present disclosure may be implemented. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense. The scope of the present disclosure is defined by the appended claims, appropriately interpreted, along with the full range equivalent to what the claims claim. In the drawings, like reference numbers refer to the same or similar function through many ways.

Hereinafter, various embodiments of the present disclosure will be described in detail with reference to the accompanying drawings in order that those skilled in the art can implement the present disclosure easily.

For reference, although it may be said that the present disclosure is applied to a face recognition apparatus using techniques such as speeded up robust features (SURF), local energy based shape histograms (LESH), gradient location and orientation histograms (GLOH) or the like, as well as using a SIFT technique, the face recognition apparatus using the SIFT technique will be described hereinafter as an example for the convenience of explanation.

FIG. 1 is a block diagram illustrating the configuration of a face recognition apparatus using a SIFT technique in accordance with an embodiment of the present disclosure.

Referring to FIG. 1, a face recognition apparatus 100 may include a face detection unit 110, a normalization unit 120, a key point position setting unit 130, a key point descriptor extraction unit 140 and a matching unit 150.

Respective functions of the blocks shown in FIG. 1 are as follows.

The face detection unit 110 may detect a face from an input image including a face. The face detection unit 110 may detect, for example, an eye in order to detect the face and may additionally detect an eyebrow, a nose, a mouth or the like. The reason of such detection may be to arrange the input facial image in the same direction as that of stored facial images.

The normalization unit 120 may normalize the detected facial image into a grey image of a predetermined size.

The key point position setting unit 130 may set key points at fixed positions in the normalized facial image.

The key point descriptor extraction unit 140 may extract a descriptor of each key point by calculating a gradient magnitude and an orientation at each image sample point in a region surrounding each key point. A method of extracting a descriptor of each of the key points is provided in a paper entitled "Distinctive image features from scale-invariant Keypoints" written by D. Lowe and published in the "International Journal of Computer Vision, Volume 60, Issue 2", the entire disclosure of which is hereby incorporated by reference. The method, however, is not necessarily limited thereto and may be implemented by applying a variety of other methods.

The matching unit 150 may determine whether or not an input facial image matches previously stored facial images using descriptors of respective key points obtained from the normalized facial image of the input facial image and descriptors of key points in a predetermined region including key points of the respective pre-stored facial images corresponding to the key points obtained from the input image (e.g., the normalized input facial image) in a DB (a database including a collection of a variety of facial images for face recognition).

More specifically, the matching unit 150, by way of calculating and comparing distances between key points of the pre-stored facial images and the input facial image using descriptors of the respective key points obtained from the normalized facial image of the input image and descriptors of key points in a predetermined region including the key points of the respective pre-stored facial images corresponding to the key points obtained from the normalized facial image of the input image, may allocate an identification symbol (ID) to each of the key points obtained from the normalized facial image of the input image and allocate the most frequently allocated identification symbol as an identification symbol of the normalized facial image of the input image.

To this end, like the input image, it is possible to detect a face from each of the pre-stored facial images, normalize the facial image into a grey image of the same size as that of the input facial image, set key points at the same positions as the positions of the key points previously set in the normalized input facial image, and extract and store in advance descriptors of the set key points.

In FIG. 1, the face detection unit 110 and the normalization unit 120 may not be mandatory. For example, when a facial image input into the key point position setting unit 130 is arranged in the same direction as that of a pre-stored facial image and has a grey image of the same size as that of the pre-stored facial image, the face detection unit 110 and the normalization unit 120 may be omitted.

Figure 2:
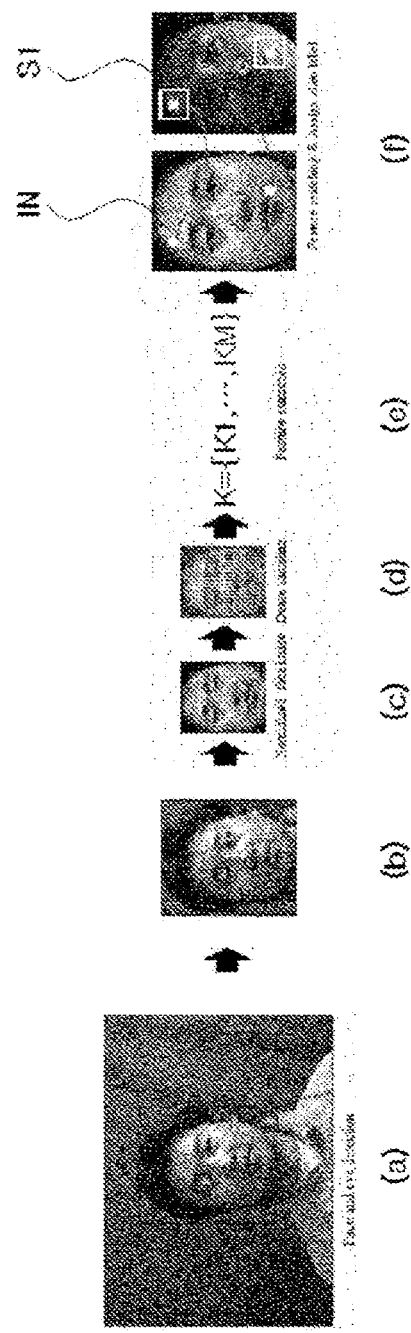
FIG. 2 is a diagram illustrating the operation of each block of the face recognition apparatus of FIG. 1.

FIG. 2 is a view illustrating the operation of each block of the face recognition apparatus of FIG. 1.

FIG. 2 (a) shows an input image, FIG. 2 (b) shows a facial image detected by the face detection unit 110, FIG. 2 (c) shows a facial image that is normalized by the normalization unit 120, FIG. 2 (d) shows a facial image expressing key points extracted by the key point position setting unit 130, and FIG. 2 (e) shows a vector K extracted by the key point descriptor extraction unit 140, which may be expressed as K={k1, . . . , kM} (where k1 denotes a descriptor extracted from the first key point and kM denotes a descriptor extracted from the M-th key point). FIG. 2 (f) shows a case where a change in the facial image is detected by the matching unit 150 and the input facial image IN is recognized as the same face as a pre-stored facial image S1.

Figure 3:
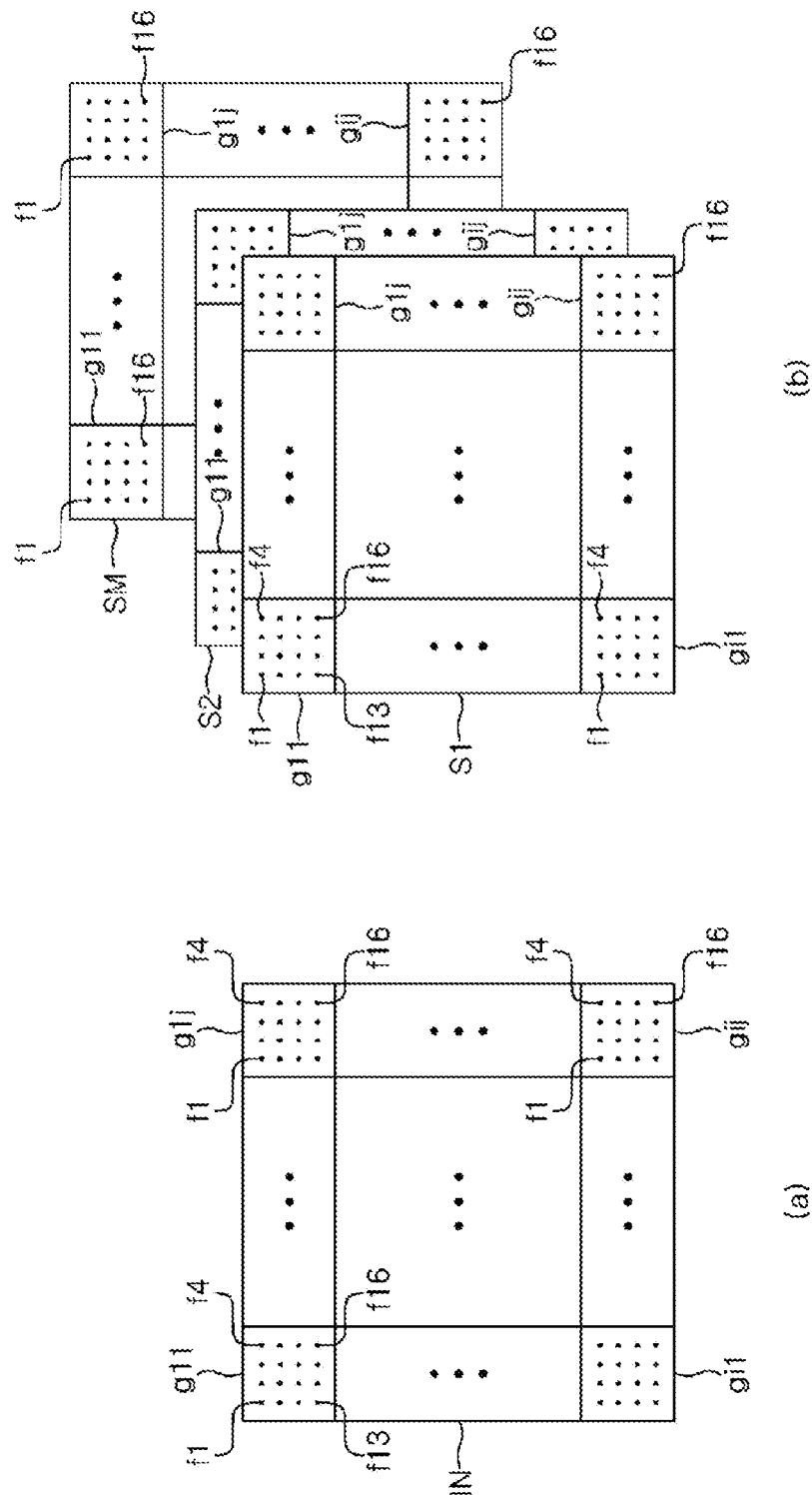
FIG. 3 is a diagram illustrating the operation of an embodiment of a matching unit of FIG. 1.

FIG. 3 is a view illustrating the operation of an embodiment of the matching unit of FIG. 1. FIG. 3 (a) shows key points of a normalized input facial image IN, and FIG. 3 (b) shows key points of M facial images S1 to SM that were normalized and pre-stored. In addition, g11 to gij denote grid blocks, for example, having a size of 4×4 of facial images IN and S1 to SM, and f1 to f16 denote sixteen key points in each of the grid blocks g11 to gij. For reference, while the number of points per block is sixteen in FIG. 3, but the number is not limited thereto.

The matching unit 150 of FIG. 1 calculates distances between the key points (a distance between f1 and f1, a distance between f1 and f2, . . . , and a distance between f1 and f16) (the distances may include Euclidean distances, but are not limited thereto) using the descriptor of the key point f1 of the grid block g11 of the input facial image IN and the descriptors of the key points f1 to f16 of the grid blocks g11 of the pre-stored facial images S1 to SM, and allocates to the key point f1 of the input facial image IN an identification symbol of a pre-stored facial image including the key point that has the shortest distance. Then, it calculates distances between the key points f2 and f1, f2 and f2, . . . , and f2 and f16 using the descriptor of the key point f2 of the grid block g11 and the descriptors of the key points f1 to f16 of the grid blocks g11 of the pre-stored facial images S1 to SM and allocates to the key point f2 of the input facial image IN an identification symbol of the pre-stored facial image including the key point that has the shortest distance. In the same way, an identification symbol among the identification symbols of the pre-stored facial images S1 to SM is allocated to each of the key points f1 to f16 of each of the grid blocks g11 to gij of the input facial image IN. That is, one of the identification symbols of the previously stored facial images S1 to SM is allocated to each of the key points f1 to f16 of the input facial image IN, and it may calculate distances between the key points using the descriptor of each key point of the input facial image IN and the descriptors of the key points in the grid blocks of all the pre-stored facial images S1 to SM corresponding to the grid block including each key point of the input facial image IN and allocate an identification symbol of the pre-stored facial image including the key point having the shortest distance as an identification symbol of the key point for each of the key points f1 to f16 of each of the grid blocks g11 to gij of the input facial image IN.

Then, the matching unit 150 may make votes for the identification symbols allocated to all the key points of the input facial image IN, wherein one of the identification symbols of the pre-stored facial images S1 to SM may be allocated to the input facial image IN. That is, the most frequently allocated identification symbol among the identification symbols allocated to all the key points of the input facial image IN may be allocated as an identification symbol of the input facial image IN. In this instance, the identification symbol most frequently allocated may be selected for each grid block, and the most frequently selected identification symbol among the selected identification symbols may be allocated as an identification symbol of the input facial image IN. However, the present disclosure is not necessarily limited thereto. When going through the above-described process, a face of the input facial image IN is recognized to be the same as the face of the pre-stored facial image having the same identification symbol as the allocated identification symbol.

Figure 4:
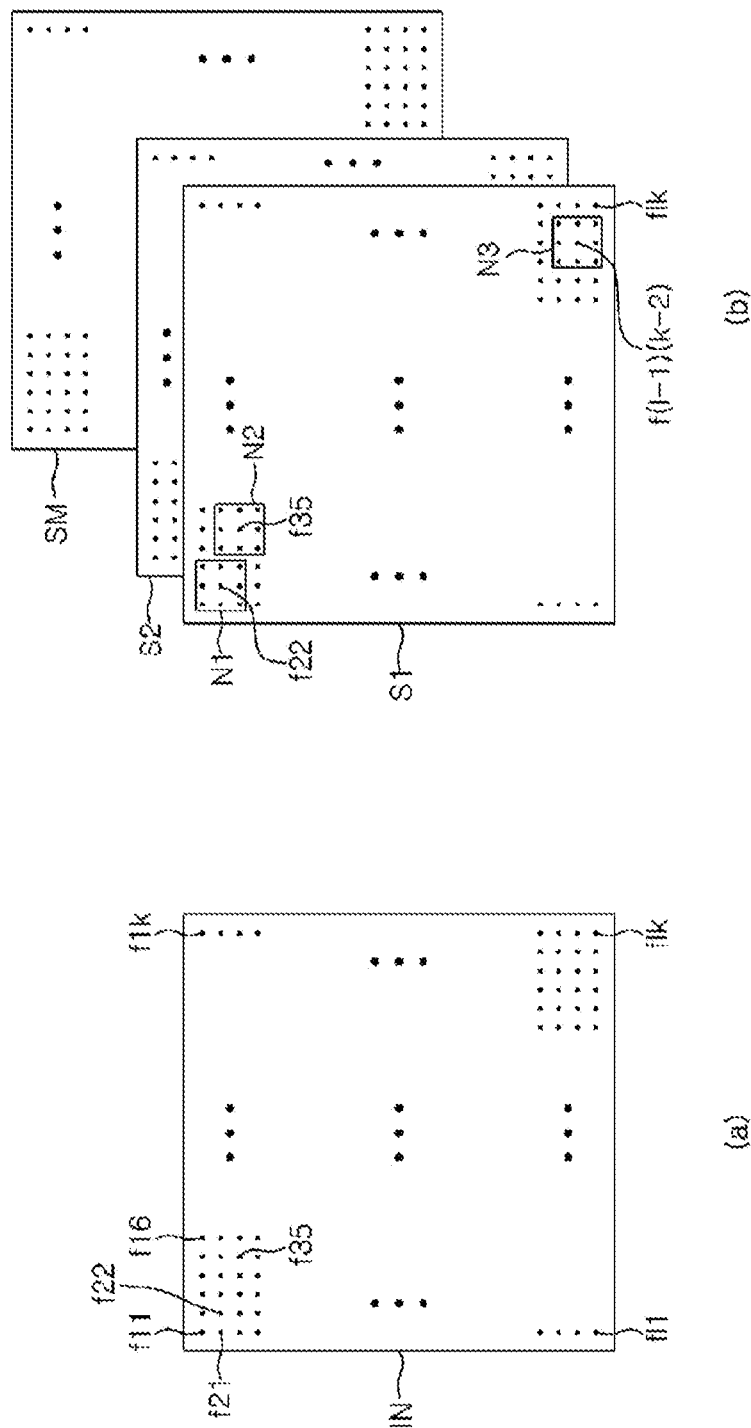
FIG. 4 is a diagram illustrating the operation of another embodiment of the matching unit of FIG. 1.

FIG. 4 is a diagram illustrating the operation of another embodiment of the matching unit of FIG. 1. FIG. 4 (a) shows key points of a normalized input facial image IN, and FIG. 4 (b) shows key points of M facial images S1 to SM that were normalized and pre-stored. In addition, f11 to f1k respectively denote the key points of the facial images IN and S1 to SM, and each of N1 to N3 denotes a surrounding block having a size of 3×3 for specifying a surrounding region of each of the key points f22, f35, . . . , and f(1−1)(k−2), and surrounding blocks may be specified for all such key points. For reference, a surrounding region has a size of 3×3 in FIG. 4, but is not limited thereto.

The matching unit 150 of FIG. 1 calculates distances between the key points using the descriptor of the key point f22 of the input facial image IN and the descriptors of the key points in the block N1 surrounding the key point f22 of each of the pre-stored facial images S1 to SM and allocates an identification symbol of the pre-stored facial image including the key point having the shortest distance. In the same way, it calculates distances between the key points using the descriptor of each of all the key points of the input facial image IN and the descriptors of the key points in the surrounding blocks including the key point of each of the pre-stored facial images S1 to SM at the position corresponding to the input facial image IN and allocates an identification symbol of the pre-stored facial image including the key point having the shortest distance. That is, one identification symbol among the identification symbols of the previously stored facial images S1 to SM is allocated to each of the key points f11 to f1k of the input facial image IN, and it calculates distances between the key points using the descriptor of each key point of the input facial image IN and the descriptors of the key points in the surrounding blocks of all the previously stored facial images S1 to SM including the key point of the position corresponding to each key point of the input facial image IN and allocates an identification symbol of the pre-stored facial image including the key point having the shortest distance as an identification symbol of the key point of the input facial image IN.

Then, the matching unit 150 allocates one of the identification symbols of the pre-stored facial images S1 to SM to the input facial image IN by voting for the identification symbols allocated to all the key points of the input facial image IN. That is, the most frequently allocated identification symbol among the identification symbols allocated to all the key points of the input facial image IN may be allocated as an identification symbol of the input facial image IN. At this point, the identification symbol most frequently allocated in each surrounding block may be first selected and then the most frequently selected identification symbol among the entire image may be allocated as an identification symbol of the input facial image IN. However, the present disclosure is not necessarily limited thereto. When going through the above-described process, a face of the input facial image IN is recognized to be the same as the face of the pre-stored facial image having the same identification symbol as the allocated identification symbol.

That is, the matching unit 150 may allocate the identification symbols to all the key points of the input facial image IN and allocates the most frequently allocated identification symbol as the identification symbol of the input facial image IN by voting for the identification symbols allocated to all the key points.

In FIGS. 3 and 4, each key point of the input facial image IN may be expressed as "a first key point", and each key point of the pre-stored facial images S1 to SM may be expressed as "a second key point."

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present disclosure or a program command known to be used by those skilled in the art of the computer software field. The computer-readable recording medium includes, for example, a magnetic medium, such as a hard disk, a floppy disk and a magnetic tape, an optical recording medium, such as a CD-ROM and a DVD, a magneto-optical medium, such as an optical disk, and a hardware device specially configured to store and execute program commands, such as a ROM, a RAM, a flash memory and the like. The program command may include, for example, a high-level language code that can be executed by a computer using an interpreter or the like, as well as a machine code generated by a compiler. The hardware devices can be configured to operate using one or more software modules in order to perform the processing according to the various embodiments of the present disclosure.

In the foregoing discussion, although the present disclosure has been described in connection with the specific matters, such as the specific components, the exemplary embodiments, and the drawings, they are provided only for assisting in the understanding of the present disclosure, and the present disclosure is not limited to the embodiments. It will be apparent that those skilled in the art can make various modifications and changes thereto from these descriptions.

Therefore, the spirit of the present disclosure should not be limited to the above-described embodiments, and the appended claims and what are modified equally or equivalently thereto will be considered to fall within the scopes of the present disclosure.

The invention claimed is:

1. A face recognition method, comprising:
   (a) setting key points at predetermined positions in an input facial image;
   (b) extracting a descriptor of each of the key points; and
   (c) determining whether the input facial image matches previously stored facial images using descriptors of first key points obtained from the input facial image and descriptors of key points in a predetermined region including second key points of the respective previously stored facial images corresponding to the first key points obtained from the input facial image, including:
   calculating and comparing distances between the first key points and the second key points using the descriptors of the first key points and the descriptors of the second key points, so as to allocate an identification symbol of a previously stored specific facial image including a second point having the shortest distance among the previously stored facial images as an identification symbol of each of the first key points; and
   allocating the most frequently allocated identification symbol as an identification symbol of the input facial image.

2. The method of claim 1, wherein when the distances between the first key points and the second key points are calculated using the descriptors of the first key points and the descriptors of the second key points, the distances are calculated as a Euclidean distance.

3. The method of claim 1, wherein step (c) comprises forming grid blocks in the facial image and sets the grid blocks as the predetermined regions.

4. The method of claim 3, wherein the method comprises calculating and comparing distances between the first key points and the second key points using the descriptors of the first key points and the descriptors of the second key points, so as to allocate an identification symbol of a previously stored specific facial image including a second point having the shortest distance among the previously stored facial images as an identification symbol of each of the first key points; selecting the identification symbol most frequently allocated in each grid block; and allocating the most frequently selected identification symbol as an identification symbol of the input facial image.

5. The method of claim 1, wherein step (c) sets a block surrounding the second key point corresponding to the first key point obtained from the facial image as the predetermined region.

6. The method of claim 5, wherein the method comprises calculating and comparing distances between the first key points and the second key points using the descriptors of the first key points and the descriptors of the second key points, so as to allocate an identification symbol of a previously stored specific facial image including a second point having the shortest distance among the previously stored facial images as an identification symbol of each of the first key points; selecting the identification symbol most frequently allocated in each surrounding block; and allocating the most frequently selected identification symbol as an identification symbol of the input facial image.

7. The method of claim 1, further comprising:
   (d) detecting a face from the input facial image; and
   (e) normalizing the detected face image into a face image of a predetermined size to generate the input facial image,
   wherein step (a) sets the key points at predetermined positions of the normalized input facial image.

8. The method of claim 7, wherein step (d) additionally detects a feature point of the face from the input facial image to arrange the detected facial image in the same direction as that of the previously stored facial image.

9. The method of claim 8, wherein the feature point comprises a feature point of an eye, a nose, or a mouth.

10. The method of claim 1, wherein the input facial image and the previously stored facial image are arranged in the same direction and have a grey image of the same size.

11. The method of claim 1, wherein in step (a), the predetermined positions on the input facial image on which the key points are fixed.

12. A face recognition apparatus, comprising:
a processor to execute:
a key point position setting unit configured to set key points at predetermined positions of an input facial image;
a key point descriptor extraction unit configured to extract a descriptor of each of the key points; and
a matching unit configured to determine whether the input facial image matches previously stored facial images using descriptors of first key points obtained from the input facial image and descriptors of key points in a predetermined region including a second key point of each of the previously stored facial images corresponding to the first key point obtained from the input facial image, wherein the matching unit further to calculate and compare distances between the first key points and the second key points using the descriptors of the first key points and the descriptors of the second key points, so as to allocate an identification symbol of a previously stored specific facial image including a second point having the shortest distance among the previously stored facial images as an identification symbol of each of the first key points, and is configured to allocate the most frequently allocated identification symbol as an identification symbol of the input facial image.

13. The apparatus of claim 12, wherein when the distances between the first key points and the second key points are calculated using the descriptors of the first key points and the descriptors of the second key points, and the distances are calculated as a Euclidean distance.

14. The apparatus of claim 12, wherein the matching unit is configured to form grid blocks in the facial image and set the grid blocks as the predetermined regions.

15. The apparatus of claim 14, wherein the matching unit is configured to calculate and compare distances between the first key points and the second key points using the descriptors of the first key points and the descriptors of the second key points, so as to allocate an identification symbol of a previously stored specific facial image including a second point having the shortest distance among the previously stored facial images as an identification symbol of each of the first key points, and is configured to select the identification symbol most frequently allocated in each grid block, and allocate the most frequently selected identification symbol as an identification symbol of the input facial image.

16. The apparatus of claim 12, wherein the matching unit is configured to set a block surrounding the second key point corresponding to the first key point obtained from the facial image as the predetermined region.

17. The apparatus of claim 16, wherein the matching unit is configured to calculate and compare distances between the first key points and the second key points using the descriptors of the first key points and the descriptors of the second key points, so as to allocate an identification symbol of a previously stored specific facial image including a second point having the shortest distance among the previously stored facial images as an identification symbol of each of the first key points, and is configured to select the identification symbol most frequently allocated in each surrounding block and allocate the most frequently selected identification symbol as an identification symbol of the input facial image.

18. The apparatus of claim 12, further comprising:
a face detection unit configured to detect the face from an initially input facial image; and
a normalization unit configured to normalize the detected face image into a face image of a predetermined size to generate the input facial image,
wherein the key point position setting unit is configured to set the key points at predetermined positions of the normalized input facial image.

19. The apparatus of claim 18, wherein the face detection unit is additionally configured to detect a feature point of the face from the input image to arrange the detected facial image in the same direction as that of the previously stored facial image.

20. A computer-readable medium for having instructions which when executed by a processor, perform:
(a) setting key points at predetermined positions in an input facial image;
(b) extracting a descriptor of each of the key points; and
(c) determining whether the input facial image matches previously stored facial images using descriptors of first key points obtained from the input facial image and descriptors of key points in a predetermined region including second key points of the respective previously stored facial images corresponding to the first key points obtained from the input facial image, including:
calculating and comparing distances between the first key points and the second key points using the descriptors of the first key points and the descriptors of the second key points, so as to allocate an identification symbol of a previously stored specific facial image including a second point having the shortest distance among the previously stored facial images as an identification symbol of each of the first key points; and
allocating the most frequently allocated identification symbol as an identification symbol of the input facial image.

21. A computer-readable medium of claim 20, wherein step (c) comprises forming grid blocks in the facial image and sets the grid blocks as the predetermined regions.

22. A computer-readable medium of claim 20, wherein step (c) sets a block surrounding the second key point corresponding to the first key point obtained from the facial image as the predetermined region.

* * * * *